United States Patent [19]

Sternberg

[11] 4,311,251
[45] Jan. 19, 1982

[54] SPRING FOR DISPENSER COVER

[76] Inventor: Henry Sternberg, 24 Pell Pl., New Rochelle, N.Y. 10804

[21] Appl. No.: 121,018

[22] Filed: Feb. 13, 1980

[51] Int. Cl.³ .............................................. A24F 15/04
[52] U.S. Cl. ...................................... 221/24; 221/229
[58] Field of Search ............... 221/229, 228, 232, 269, 221/279, 24; 215/317, 273; 220/339; 292/DIG. 11; 49/386

[56] References Cited

U.S. PATENT DOCUMENTS

| 2,620,061 | 12/1952 | Uxa | 221/229 |
| 2,853,206 | 9/1958 | Uxa | 221/229 |
| 3,410,455 | 11/1968 | Haas | 221/229 |
| 3,565,284 | 2/1971 | Hinterrieter | 221/229 |
| 3,844,445 | 10/1974 | Haas | 221/229 |
| 3,845,882 | 11/1974 | Haas | 221/229 X |
| 3,942,683 | 3/1976 | Haas | 221/229 |
| 4,171,753 | 10/1979 | Vreede | 221/229 X |

FOREIGN PATENT DOCUMENTS 1224690 6/1960 France .................................. 221/229

Primary Examiner—Allen N. Knowles
Attorney, Agent, or Firm—Henry Sternberg

[57] ABSTRACT

A receptacle for receiving and sequentially dispensing individual shaped bodies from a stack of like bodies. The receptacle has a pivotal cover at the dispensing end thereof and a cap mounted on said cover. The cap has a skirt extending around the pivotal cover. This skirt has a first portion engaging the cover, a second portion adapted to engage the housing of the receptacle when the cover is pivoted toward an open position and a pair of elastically deformable portions intermediate said first and second portions. The elastically deformable portions constitute a spring for biasing the pivoted cover into its closed position. The cover also has a finger portion for pushing the uppermost shaped body and dispensing it from the receptacle when the cover is pivoted against the spring bias.

14 Claims, 5 Drawing Figures

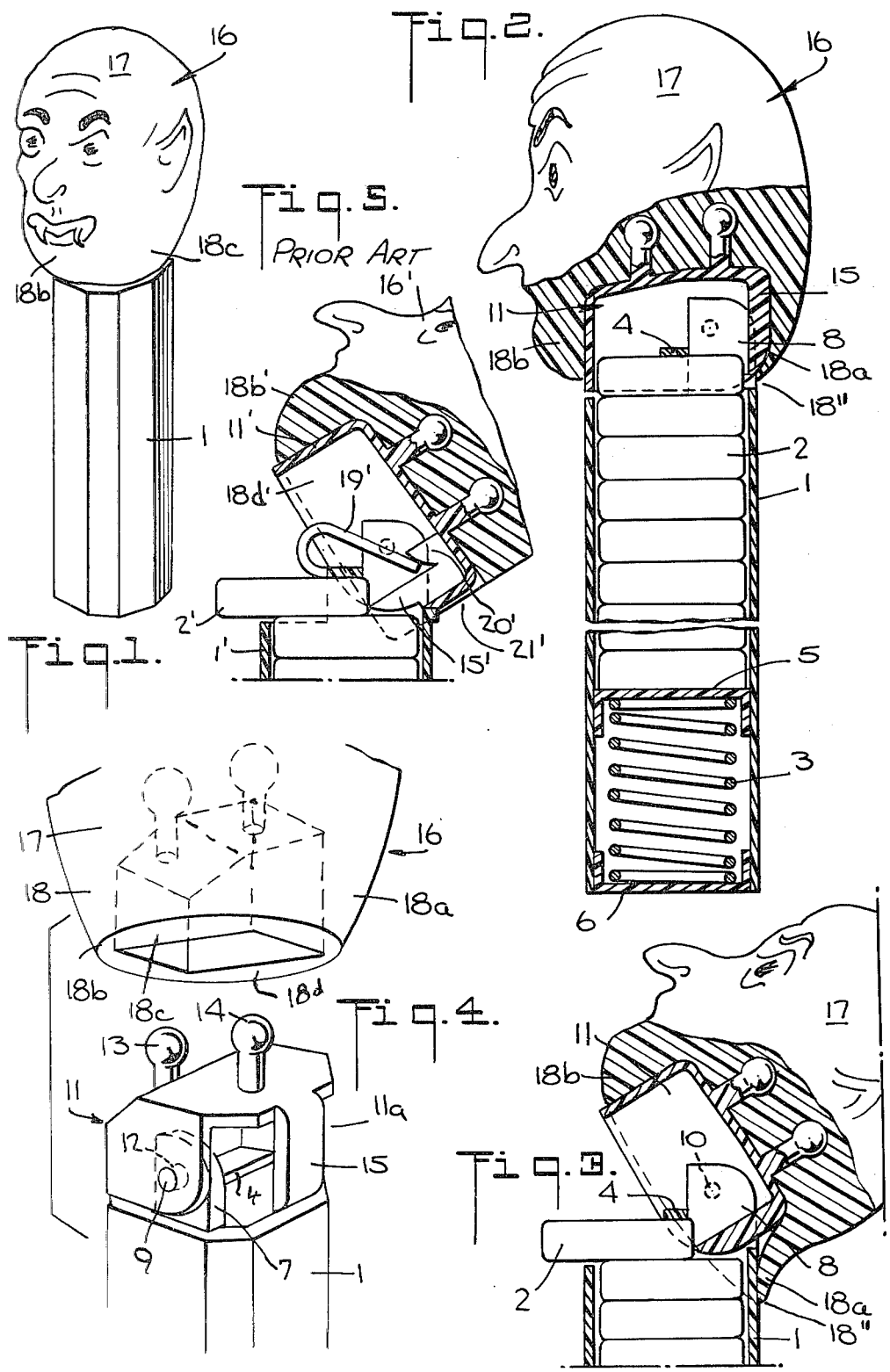

SPRING FOR DISPENSER COVER

The present invention relates to improvements in receptacles for receiving and sequentially dispensing individual shaped bodies from a stack of like shaped bodies received in the receptacle.

BACKGROUND OF THE INVENTION

U.S. Pat. No. 3,942,683 discloses a receptacle, comprising a housing having a dispensing end and a pivotal cover at the dispensing end. Spring means in the housing presses the stack of shaped bodies, such as tablets, towards the dispensing end to place sequential uppermost shaped bodies of the stack into a dispensing position. A flexible plastic spring is formed on part of the plastic housing at the dispensing end thereof and is thus located at the interior of the pivotal cover for biasing the latter into closed position. The cover has a portion for pushing the uppermost shaped body and dispensing it from the receptacle when the cover is pivoted against the spring bias. Since the spring for biasing the cover is, according to the patent, a complex shape integrally molded to the housing at the interior of the dispensing end thereof, the manufacture of these receptacles is correspondingly more expensive.

It is also known to make the cover in the shape of a head or to attach to the cover a cap in the shape of a head so that the cap is integral with, and pivots with, the cover. Such caps are used to provide the receptacle with a toy-like quality and may be formed of rubbery material which is pliable to the touch.

The prior art receptacle shown in FIG. 5 has a curled leaf spring 19', integrally molded to the housing 1' at the dispensing end of the housing 1'. The leaf spring 19' and a cam 20' integrally molded at the interior of the cover 11' cooperate to bias the cover 11' into its closed position. The cap 16' of the prior art, has a skirt 18' with front portion 18b' and side portions 18c' and 18d', respectively, for covering only the front and sides of the cover 11'. Skirt 18' has an opening 21', at the rear, in registry with the opening at the rear of the cover 11', so as to provide clearance for the cover 11' to pivot with respect to the housing 1'. The cap 16' of the prior art is thus totally non-functional and is used only for the purpose of providing a toy-like appearance.

OBJECTS OF THE INVENTION

It is the primary object of this invention to simplify the manufacture of the receptacle, more particularly by doing away with the complex molded cover spring.

The above and other objects are accomplished in accordance with the invention by configurating the rubbery cap such that it also functions as the spring which biases the pivotal cover into a closed position.

According to a preferred embodiment of the present invention, the cap, which also constitutes the spring, is injection molded polyvinyl chloride.

SUMMARY OF THE INVENTION

From a broad aspect, the present invention provides a receptacle for receiving and sequentially dispensing individual shaped bodies from a stack of a plurality of these bodies received in the receptacle. One of the receptacle parts is a housing having two opposed wall extensions at the dispensing end thereof. Another receptacle part is a pivoted cover at the dispensing end. A third receptacle part is a cap which is attached to the cover and which, in addition to adding a toy-like quality, constitutes the spring for biasing the cover into closed position. Spring means are provided in the housing for pressing the stack of shaped bodies towards the dispensing end to place sequential uppermost ones of the shaped bodies of the stack into a dispensing position. A transverse ledge extends between the opposed wall extensions of the housing in a horizontal plane and integral with the wall extensions. The uppermost shaped body is pressed by the spring means against the ledge. The receptacle includes mounting means for mounting the cap on the cover. The cap has a top portion and a skirt depending from the top portion and extending around the entire periphery of the pivotal cover when the cap is mounted on the cover. The skirt has an elastically deformable portion adapted to engage the housing when the cover is pivoted toward an open position. The elastically deformable portion constitues the spring for biasing the pivotal cover into its closed position. A pivot is provided for pivoting the cover on the opposed wall extensions. The cover has a portion in the region of the pivot for pushing the uppermost shaped body and dispensing it from the receptacle when the cover is pivoted against the spring bias.

BRIEF DESCRIPTION OF THE DRAWINGS

The above and other objects, advantages and features of the present invention will become more fully understood by reference to the following detailed description of certain now preferred embodiments thereof, taken in conjunction with the accompanying drawing wherein:

FIG. 1 is a perspective view of one embodiment of a receptacle according to this invention;

FIG. 2 is a partly sectional side view of the receptacle of FIG. 1;

FIG. 3 is a perspective view of the top of the FIG. 1 receptacle with the cover closed and the cap detached and shown separately, partly cut-away;

FIG. 4 shows the top of the FIG. 1 receptacle, partly sectional, with the cover in open position; and FIG. 5 is a side view partly sectional of the top of a prior art receptacle showing the separate spring and cap.

DETAILED DESCRIPTION OF THE DRAWINGS

Referring now to the drawings, the receptacle is shown to comprise a housing 1 receiving a stack of like tablets 2 which are sequentially dispensed from the receptacle. No cover-biasing spring is provided as part of the housing. In this way, the housing is of much simpler construction and therefor can be produced more cheaply than the housings of the known receptacles described above. A spring means constituted by compression spring 3 is mounted in the receptacle housing 1 between a detachable bottom 6 and a movable tablet stack support bottom 5 for pressing the stack of tablets 2 towards the dispensing end of the receptacle housing to place sequential uppermost tablets of the stack into a dispensing position delimited by transverse ledge 4 which connects two opposite wall extensions of the receptacle housing and against which the uppermost tablet is pressed.

The ledge 4 extends between the two extensions 7 and 8 of the housing side walls whereon the receptacle cover 11 is supported. As shown, the housing side wall extensions 7 and 8 carry a pair of pivot pins 9 and 10 which receive the bearing bores 12 of the cover for pivotal support of the cover on the housing. A cap 16 has a top portion 17 positioned over the top surface of the cover and a downwardly depending skirt 18 surrounding and snugly engaging the walls of the pivotal cover 11 at the forward portion and at the sides thereof, while extending over, so as to cover, the opening 11a at the rear of the pivotal cover 11. The cap member is preferably of PVC of the type which is elastically deformable to an extent such that the skirt may be stretched peripherally and will return to its original condition when the force causing the stretching is released. In this way, the elastically deformable skirt 18 of cap 16 operates as a spring for biasing the pivotal cover 11 into the closed position shown in FIG. 1, i.e., counterclockwise.

As appears from the drawing, the receptacle housing 1, with its side wall extensions 7, 8, is integral with ledge 4. This integral unit may be injection molded from a rigid thermoplastic resin such as a rigid polystyrene or like plastic.

In the preferred embodiment the cover is formed with a pair of nipples 13, 14 at its top surface for receiving thereon and retaining the cap member 16. Cap 16 is preferably of a bulbous shape in the form of a head having a face. The head has a cavity formed at the base thereof by said depending skirt 18 and opening downwardly so as to snugly fit entirely around the cover 11 when the nipples are received in a pair of corresponding cavities formed in the lower surface of the cap. The rear wall portion 18a of the skirt overlies and thus closes the opening 11a at the rear of the cover memember 11.

The top portion of the cap member is preferably hollow and the walls of the downwardly depending skirt 18 of the cap member are dimensioned sufficiently thin so as to act similarly to a rubber band fitting snugly around the periphery of the pivotal cover. The walls of the downwardly depending skirt are stretchable peripherally and since the first, or front, portion 18b snugly fits against the front wall of the cover and the rear portion 18a covers the rear opening of the cover and thus engages the rear surface of the upper rear portion of the housing (preferably including the rear surfaces of the opposed wall extensions of the housing). As shown in FIG. 3 the side portions 18c and 18d of the skirt intermediate the front and rear portions 18a and 18b are elastically deformed, i.e., stretched, during pivoting of the cover toward its open position. The elastically deformable skirt therefor constitutes a spring which when deformed, in response to opening of the cover, biases the latter into the closed position thereof. Consequently, when the user, after pivoting the cover into open position, releases the force on the cover, the skirt constituting the spring urges the cover back into its fully closed position. At the rear opening of the cover member a finger portion 15 extends downwardly from the top of the cover such that when the cover is pivoted toward its open position, the finger 15 moves into the space between the side wall extensions for dispensing the uppermost tablet. The second, or rear, portion of the skirt fits snugly around the rear of said finger but is prevented by the rear surface of the housing from following the finger into the space between the wall extensions during operating of the cover. While it is preferred that the lowermost rear edge 18" of the skirt 18 is able to slide smoothly down along the top rear surface of the housing 1 during opening of the pivotal cover (FIG. 3) it is also possible to provide a shoulder (not shown) on the housing for engaging such rear edge 18" of the skirt.

According to the latter construction the rear or second portion of the skirt would tend to curl in response to pivoting the cover towards its open position and this curling of the elastically deformable material would provide additional spring action for biasing the cover back towards its closed position.

As can be seen from FIG. 3, when the cover is pivoted against the spring bias supplied by skirt 18, in a clockwise direction, the interaction between the rear surface of the housing and the rear portion 18a of the skirt, will stretch the skirt. At the same time finger portion 15 of the cover 11 pushes the uppermost tablet 2 forwardly to dispense it from the receptacle. The elasticity of the skirt material is so chosen that the deformation remains within the elastic limits thereof so that the skirt will return to its original shape when the cover is closed again.

The assembly of the housing 1 with the cover 11 is very simple. The side walls of the cover are slightly spread to fit the bearing bores 12 thereof over the pivot pins 9, 10 of the housing side wall extensions 7, 8. The cap is then pressed onto the cover so that the latter is received within the cavity formed by the skirt and the cap is detachably maintained in that position by the nipples being received in the respective corresponding cavities. This is all that is required and no extra spring assembly is involved. This makes the manufacture of the receptacle so inexpensive that it may be offered as a disposable receptacle for dispensing tablets. The elastically deformable skirt will continue to function as a spring without spring failure even when the receptacle is refilled a number of times. According to the preferred embodiment the entire cap is formed of elastically deformable rubbery material.

While it may be most desirable to fabricate the cap portion out of polyvinylchloride, other suitable materials, such as rubber, may be used. Since many polyvinylchloride materials are commercially available in various forms of elasticity the proper material for the dimension in question may be readily selected by those skilled in the art.

As used herein the term "housing" and "housing means" shall be deemed to include not only housings of a variety of shapes and cross-sections but also housings comprised of two or more housing members where one is telescoped within another or otherwise connected to another.

It will be understood, of course, that the embodiment illustrated herein is for illustrative purposes only and that various changes in design, structure and arrangement may be made within the spirit and scope of the appended claims.

What is claimed is:

1. A receptacle for receiving and sequentially dispensing individual shaped bodies from a stack of like ones of said bodies received in the receptacle, comprising housing means having two opposed wall extensions at a dispensing end thereof, a pivotal cover at the dispensing end, spring means in the housing means for pressing the stack of shaped bodies towards the dispensing end to place sequential uppermost ones of the shaped bodies of the stack into a dispensing position, transverse ledge means located intermediate the opposed wall extensions, the uppermost shaped body being pressed by the spring means against the ledge means, a cap for said pivotal cover, mounting means for mounting said cap on said cover, said cap having a skirt portion extending around said pivotal cover, said skirt having a first portion engaging said cover, a second portion spaced from said first portion and adapted to engage said housing means when the cover is pivoted toward an open position and a pair of elastically deformable portions intermediate said first and second portions, said elastically deformable portions constituting a spring for biasing the pivoted cover into closed position, a pivot for pivoting the cover on the opposed wall extensions, and the cover having a finger portion in the region of the pivot for pushing the uppermost shaped body and dispensing it from the receptacle when the cover is pivoted against the last mentioned spring bias.

2. The receptacle of claim 1, wherein the cap further comprises a top portion overlying the top of the cover and said skirt depending peripherally from said top portion of said cap to fully encircle said cover.

3. The receptacle of claim 2, wherein substantially the entire cap is formed of polyvinylchloride material.

4. The receptacle of claim 3, wherein the top portion of the cap is in the shape of a head having a face and wherein the skirt forms part of said head.

5. The receptacle of claim 4 wherein said pair of intermediate portions of said skirt are adjacent said opposed wall extensions.

6. The receptacle of claim 5, wherein said intermediate portions of said skirt are sufficiently thin to permit elastic deformation thereof in response to a force applied to the cover by a user to open the cover while being sufficiently elastic to fully close the cover in response to release of such force.

7. The receptacle of claim 1, wherein said cover has an upper surface and said top portion of said cap has a lower surface overlying said upper surface and said mounting means comprises at least one protrusion on one of said surfaces and at least one cavity on the other of said surfaces adapted to accept and retain said protrusion for detachably connecting said cap to said cover.

8. The receptacle of claim 7, wherein there are a pair of rigid protrusions on said top surface of said cover and a pair of corresponding elastically deformable cavities on the lower surface of said cap, each of said protrusions having an enlarged portion at the free end thereof and said cavities having entrance openings of smaller size than said enlarged portions and being elastically expandable to receive said enlarged portions and to thereafter urge said enlarged portions to remain in said cavities so as to detachably hold said cap on said cover.

9. The receptacle of claim 1, wherein said opposed wall extensions have rear surfaces in the region of the pivot and said second portion of said skirt engages said housing means along such rear surfaces when the cover is pivoted toward open position.

10. The receptacle of claim 1, wherein said skirt is made of elastically deformable material and the dimensions of the skirt are such as will provide a spring bias sufficient to fully close the cover after release of the force used to open the cover.

11. The receptacle of claim 9, wherein said finger portion of said cover is located intermediate and at least partly rearwardly of said rear surfaces of said opposed wall extensions, and said second portion of said skirt engages the rear surface of said finger portion.

12. The receptacle of claim 11, wherein the cover has a front surface, a pair of side surfaces and a rearward facing opening into which said finger portion extends, said skirt extending snugly around said front and side surfaces and across said rearwardly facing opening so as to be engageable by rear wall portions of said housing means in response to opening said cover whereby said elastically deformable skirt is stretched to produce said spring bias for urging said cover into closed position.

13. A cap for the pivotal cover of a candy dispenser having a dispenser body, said cover pivotably connected to said body, said cap comprising an upper portion adapted to overlie the top of the cover, means at the underside of said upper portion for detachably gripping the cover, a skirt depending downwardly from said upper portion around the entire periphery thereof, at least said skirt being formed of elastically deformable rubbery material and adapted to snugly surround the cover at the front, rear, and sides of the latter, and said skirt having side portions intermediate the front and rear portions thereof which side portions are dimensioned such that they will act as a spring to bias the cover toward its closed position in response to stretching of said side portions when the portion of the skirt which is adjacent the rear of the cover coacts with the dispenser body during pivoting of the cover with respect thereto.

14. In a device for receiving and sequentially dispensing individual shaped bodies from a stack of like bodies, said device including housing means having a dispensing end, a cover mounted for pivotal movement at said dispensing end and means at said dispensing end for dispensing the uppermost of said shaped bodies in response to pivotal movement of said cover from a closed to an open position thereof, the improvement comprising: a cap for said cover, said cap having a skirt of elastomerically deformable material extending peripherally around said cover and having a first peripheral portion operatively engaging a first portion of the cover and forced to move with such cover when the cover is pivoted to open position and a second peripheral portion operatively engaging the housing means at a location remote from said first portion of said cover, and a pair of additional peripheral portions intermediate said first and second peripheral portions, said housing means including means restraining said second peripheral portion of said skirt from movement relative to said housing means in response to pivotal movement of said cover, said additional peripheral portions of said skirt being so dimensioned as to constitute a spring for biasing the cover to closed position in response to pivotal movement of said cover toward the open position thereof.

* * * * *